(12) United States Patent
Kaneko et al.

(10) Patent No.: US 11,283,320 B2
(45) Date of Patent: Mar. 22, 2022

(54) STATOR COMPRISING AN INSULATING FILM OF A COIL HAVING PROTECTIVE PAINT

(71) Applicant: HONDA MOTOR CO., LTD., Tokyo (JP)

(72) Inventors: Ryotaro Kaneko, Wako (JP); Keisuke Azusawa, Wako (JP); Tadao Nishiyama, Wako (JP); Yasushi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 16/572,772

(22) Filed: Sep. 17, 2019

(65) Prior Publication Data

US 2020/0091790 A1 Mar. 19, 2020

(30) Foreign Application Priority Data

Sep. 19, 2018 (JP) .............................. JP2018-175008

(51) Int. Cl.
*H02K 3/34* (2006.01)
*H02K 3/30* (2006.01)
*H02K 3/38* (2006.01)

(52) U.S. Cl.
CPC ............... *H02K 3/345* (2013.01); *H02K 3/30* (2013.01); *H02K 3/34* (2013.01); *H02K 3/38* (2013.01)

(58) Field of Classification Search
CPC ............ H02K 3/30; H02K 3/34; H02K 3/345; H02K 3/38

USPC .......................................... 310/208, 214, 215
See application file for complete search history.

(56) References Cited

U.S. PATENT DOCUMENTS

| 6,462,453 | B1 * | 10/2002 | Asao | H02K 3/12 |
| | | | | 310/179 |
| 2004/0145257 | A1 * | 7/2004 | Oohashi | H02K 3/50 |
| | | | | 310/71 |
| 2014/0319942 | A1 * | 10/2014 | Nakayama | H02K 15/0435 |
| | | | | 310/71 |
| 2017/0200554 | A1 * | 7/2017 | Kudo | H01F 27/255 |
| 2019/0089218 | A1 * | 3/2019 | Azusawa | B32B 3/30 |

FOREIGN PATENT DOCUMENTS

| CN | 103733481 | 4/2014 |
| JP | 2003-260407 | 9/2003 |
| JP | 2012-222857 | 11/2012 |
| JP | 2012-235648 | 11/2012 |

(Continued)

OTHER PUBLICATIONS

Kikuchi et al., English Machine Translation of JP 2012-222857 (Year: 2012).*

(Continued)

*Primary Examiner* — Tulsidas C Patel
*Assistant Examiner* — Rashad H Johnson
(74) *Attorney, Agent, or Firm* — Amin, Turocy & Watson, LLP

(57) ABSTRACT

A stator includes a stator core, and a coil mounted on the stator core and having an insulating film, at least a part of the insulating film being coated with a protective paint, wherein a concave section is formed in a surface of the insulating film, and the protective paint is present in the concave section. The insulating film has hollow capsules formed therein.

12 Claims, 4 Drawing Sheets

(56) References Cited

FOREIGN PATENT DOCUMENTS

| JP | 2017-163666 | 9/2017 |
| JP | 2018-067516 | 4/2018 |
| JP | 2018-117402 | 7/2018 |

OTHER PUBLICATIONS

Furuya et al., English Machine Translation of JP 2018-067516 (Year: 2018).*
Nakayama et al., English Machine Translation of CN103733481 (Year: 2014).*
Yamaguchi et al., English Machine Translation of JP2017163666 (Year: 2017).*
Japanese Office Action for Japanese Patent Application No. 2018-175008 dated Apr. 14, 2020.
Chinese Office Action for Chinese Patent Application No. 201910873304.1 dated May 6, 2021.

* cited by examiner

STATOR COMPRISING AN INSULATING FILM OF A COIL HAVING PROTECTIVE PAINT

CROSS-REFERENCE TO RELATED APPLICATION

Priority is claimed on Japanese Patent Application No. 2018-175008, filed Sep. 19, 2018, the content of which is incorporated herein by reference.

BACKGROUND OF THE INVENTION

Field of the Invention

The present invention relates to a stator.

Description of Related Art

In the related art, for a stator for a rotating electric machine, a configuration including a coil formed by being mounted on a stator core by inserting a conductor segment into slots formed in a stator core and joining conductor end portions protruding from the stator core is known. In such a stator, after the conductor end portions are joined to each other, coating using a protective paint is performed in order to insulate the joining section.

For example, Japanese Unexamined Patent Application, First Publication No. 2003-260407 discloses a coil end protection coating method of dipping a coil tip portion heated in a furnace into a fluidized dipping vessel filled with a powder resin (a protective paint), and attaching the powder resin melted by fusing the powder resin to a coil welding section using heat of the coil.

SUMMARY OF THE INVENTION

Incidentally, an outer circumference of a conventional coil is covered with an insulating film, and a conductor is exposed to the vicinity of a joining section. When coating of a protective paint is performed, in order to reliably perform insulating processing, there is a need to coat the protective paint over a conductor segment and the insulating film.

However, in the technology disclosed in Japanese Unexamined Patent Application, First Publication No. 2003-260407, an adhesive property between the insulating film and the protective paint may be decreased according to a combination of the insulating film and the protective paint. Accordingly, when peeling and raising of the protective paint occur, the insulating performance may be decreased due to foreign substances being incorporated or a conductor being exposed. In addition, it is necessary to set the combination in consideration of the adhesive property, which limits a degree of freedom in powder coating or material selection for the film. Accordingly, in the related art, it is required to provide a stator in which an adhesive property between the insulating film and the protective paint of the coil is improved, and the insulating performance in the coil end is secured.

An aspect of the present invention is directed to provide a stator in which an adhesive property between an insulating film and a protective paint of a coil is improved, and insulating performance in a coil end is secured.

(1) A stator according to an aspect of the present invention includes a stator core; and a coil mounted on the stator core and having an insulating film, at least a part of the insulating film being coated with a protective paint, wherein a concave section is formed in a surface of the insulating film, and the protective paint enters the concave section.

(2) In the aspect of the above-mentioned (1), the protective paint may have a powder, and an internal form of the concave section may be larger than an external form of the powder.

(3) In the aspect of the above-mentioned (1) or (2), the insulating film may be formed of a polyimide having hollow capsules.

According to the aspect of the above-mentioned (1), since the concave section is formed in a surface of the insulating film, a contact area between the insulating film and the protective paint can be increased due to the concave section, and an adhesive property of the protective paint with respect to the insulating film can be improved. In addition, the adhesive property of the protective paint with respect to the insulating film can be improved by an anchor effect in which the protective paint enters the concave section. Accordingly, peeling and raising of the protective paint can be minimized, and a decrease in insulating performance due to foreign substances being incorporated or the conductor being exposed can be minimized.

In addition, since the adhesive property between the insulating film and the protective paint can be improved regardless of a combination of materials of the insulating film and the powder coating, a degree of freedom in material selection of the insulating film and the powder coating can be improved.

Accordingly, it is possible to provide a stator in which an adhesive property between the insulating film and the protective paint of the coil is improved and insulating performance in the coil end is secured.

According to the aspect of the above-mentioned (2), since the protective paint has the powder and the internal form of the concave section in the insulating film is larger than the external form of the powder, the power can reliably enter the concave section. Accordingly, in comparison with the case in which the internal form of concave section is smaller than the external form of the powder, a contact area between the insulating film and the powder can be increased. Accordingly, peeling and raising of the powder with respect to the insulating film can be minimized, and a decrease in insulating performance due to foreign substances being incorporated or the conductor being exposed can be minimized.

Accordingly, it is possible to provide the stator in which the adhesive property between the insulating film and the protective paint of the coil is improved and insulating performance in the coil end is secured.

According to the aspect of the above-mentioned (3), since the insulating film is formed of a polyimide including hollow capsules, convex sections are formed on the surface of the insulating film as a plurality of protruding capsules. Here, the concave sections are formed between the convex sections of the capsules. Accordingly, the adhesive property of the protective paint with respect to the insulating film can be improved when the protective paint enters the concave section.

In addition, there is no need to provide a separate process of forming the concave section in the insulating film, and a manufacturing process can be simplified.

Accordingly, it is possible to provide the stator in which the adhesive property between the insulating film and the protective paint is improved using a simple configuration.

DETAILED DESCRIPTION OF THE INVENTION

Hereinafter, embodiments of the present invention will be described with reference to the accompanying drawings.

First Embodiment

Figure 1:
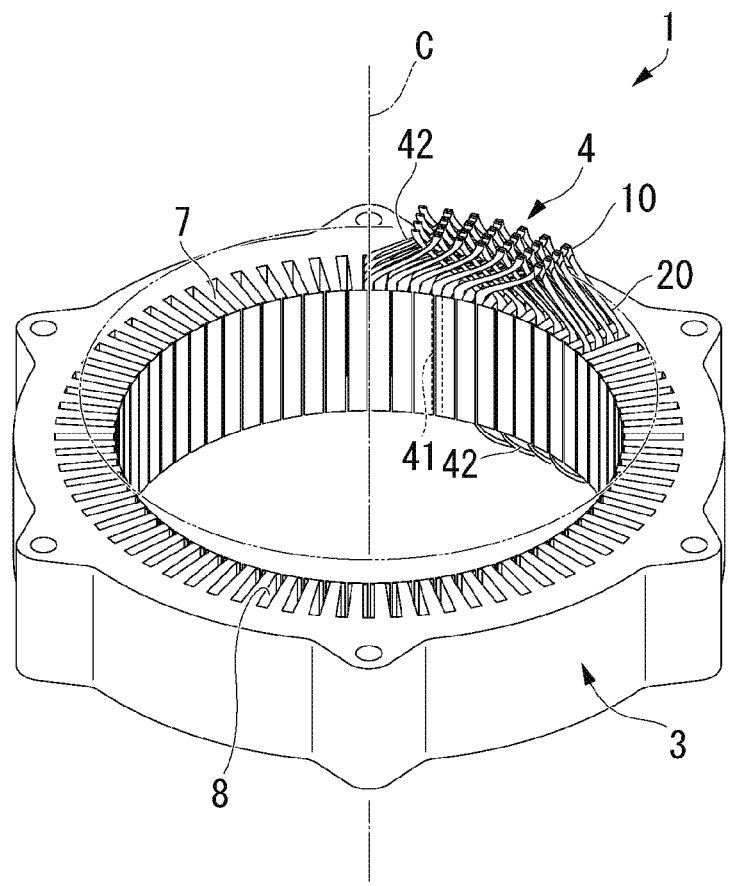
FIG. 1 is a perspective view of a stator according to a first embodiment.

FIG. 1 is a perspective view of appearance of a stator 1. The stator 1 includes a stator core 3 and a coil 4.

The stator core 3 is formed in an annular shape about an axis C. Teeth 7 are formed on an inner circumferential surface of the stator core 3. The teeth 7 protrude inward from the inner circumferential surface of the stator core 3 in the radial direction. A plurality of teeth 7 are provided in a circumferential direction. Slots 8 are formed between the teeth 7, and the coil 4, which will be described below, is inserted into the slots 8. A rotor (not shown) is pivotably disposed about the axis C in the stator core 3.

In the following description, a direction along the axis C of the stator core 3 may be referred to as an axial direction, a direction perpendicular to the axis C may be referred to as a radial direction, and a direction around the axis C may be referred to as a circumferential direction.

The coil 4 is mounted in the slots 8 of the stator core 3. Specifically, the coil 4 is fixed to the stator core 3 by inserting the coil 4 into the slots 8 from one side in the axial direction (a lower side in FIG. 1) while overlapping plural times in the radial direction and the circumferential direction, and joining tip portions of the coil 4 protruding from the slots 8 toward the other side in the axial direction (an upper side in FIG. 1). A portion of the coil 4 inserted into the slots 8 is a coil insertion section 41, and portions protruding from an end surface of the stator core 3 toward one side and the other side in the axial direction are coil ends 42.

Figure 2:
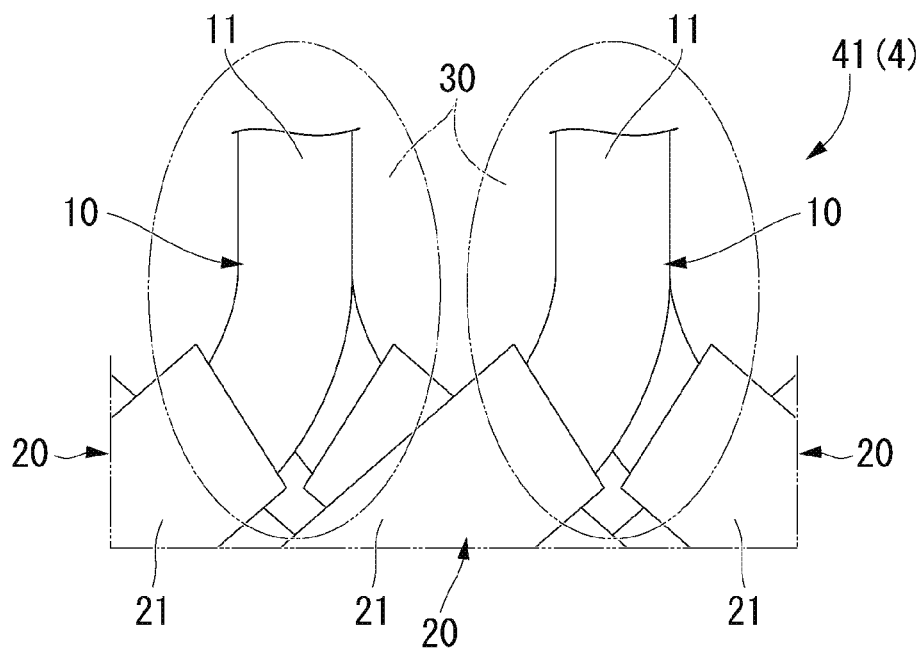
FIG. 2 is an enlarged view of a coil end according to the first embodiment.

The coil 4 has a conductor 10, an insulating film 20 and a protective paint 30 (see FIG. 2).

FIG. 2 is an enlarged view of the coil ends 42 protruding toward the other side in the axial direction.

The conductor 10 configures a core portion of the coil 4, and is formed in a linear shape having a rectangular cross section. The conductor 10 has welding sections 11 formed on tip portions of the coil ends 42 protruding toward the other side in the axial direction. The neighboring welding sections 11 are electrically and physically bonded to each other through welding.

Figure 3:
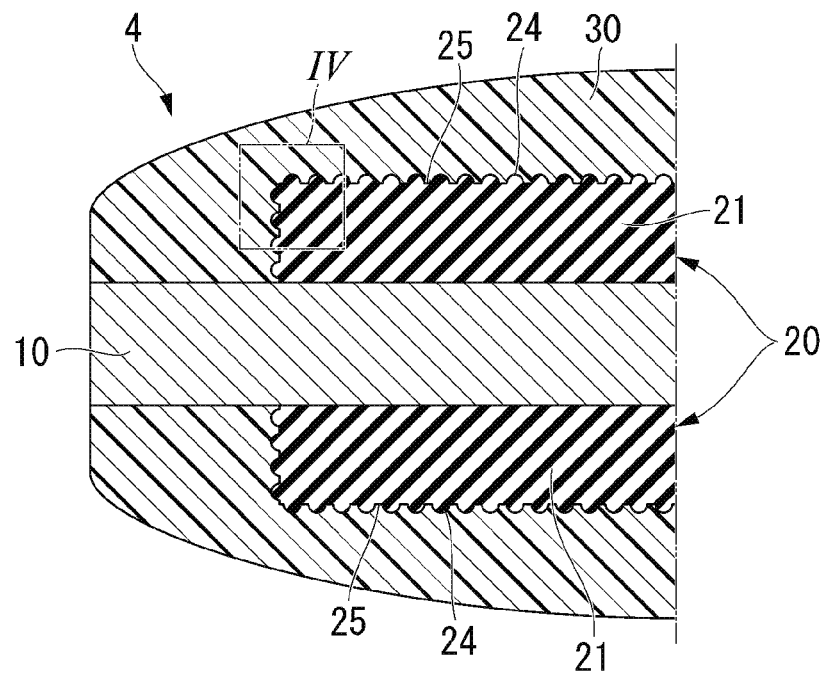
FIG. 3 is a cross-sectional view of a coil in the vicinity of a welding section according to the first embodiment.
Figure 4:
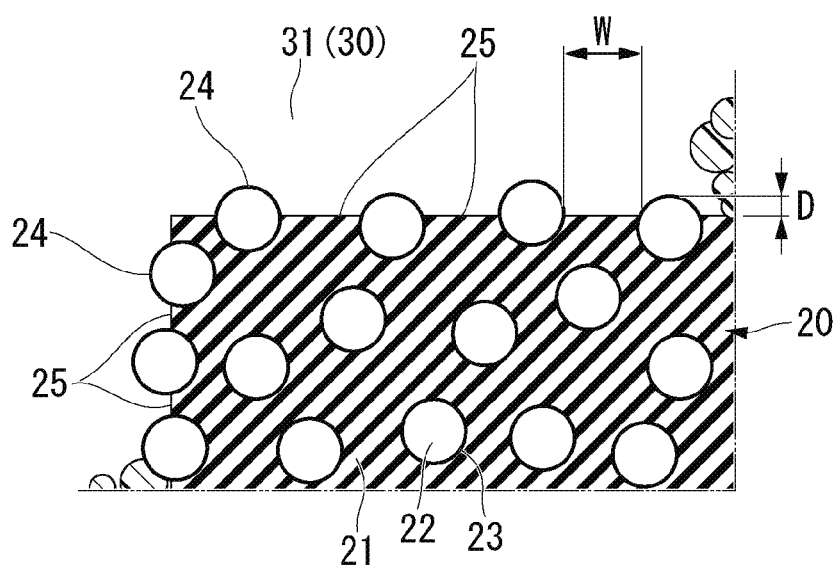
FIG. 4 is a cross-sectional view of a portion IV in FIG. 3.

FIG. 3 is a cross-sectional view of the coil 4 in the vicinity of the welding sections 11, and FIG. 4 is a cross-sectional view of a portion IV in FIG. 3.

The insulating film 20 covers an outer circumferential section of the conductor 10. The insulating film 20 is formed of an insulating material such as a resin or the like. The insulating film 20 is formed throughout the entire length of the conductor 10 except in the vicinity of the welding sections 11. In other words, the conductor 10 is exposed to the insulating film 20 in the vicinity of the welding sections 11. A portion of the conductor 10 exposed from the insulating film 20 and at least a part of the insulating film 20 are coated with the protective paint 30.

The insulating film 20 has a film main body 21, a capsule 23 (see FIG. 4), convex sections 24 and concave sections 25.

The film main body 21 is formed of an insulating resin such as polyimide or the like.

As shown in FIG. 4, the film main body 21 has a plurality of hollow capsules 23 formed therein.

The capsules 23 are formed of a resin different from that of the film main body 21. The capsules 23 are formed of a resin such as a silicone or the like. The capsule 23 is formed in a spherical shape. The inside of the capsule 23 is a vacancy 22.

Among the capsules 23, portions at least some parts are exposed to the outside compared to an outer circumferential surface of the film main body 21 are referred as the convex sections 24. Portions between the convex sections 24 are referred as the concave sections 25. That is, the concave sections 25 are formed in a surface of the insulating film 20 by the capsules 23.

The conductor 10 exposed from the insulating film 20 and the insulating film 20 in the vicinity thereof are coated with the protective paint 30. The protective paint 30 is present in the concave section 25. The protective paint 30 is present on at least a part of the concave section 25. The concave section 25 is filled with the protective paint 30. The protective paint 30 has a powder 31. Specifically, coating with the protective paint 30 is so-called powder coating of attaching the powder 31 to a member to be painted (in the embodiment, the conductor 10 and the insulating film 20) and then heating the powder to form a protective film. An external form of the powder 31 is smaller than an internal form of the concave section 25. In the embodiment, the powder 31 is present in the concave section. In the embodiment, the powder 31 is present on at least a part in the concave section. In the embodiment, the concave section is filled with the powder 31.

Here, a method of setting an opening width W and a depth D (hereinafter, an external form of the concave section 25) of the concave section 25 in the insulating film 20 will be described.

Figure 5:
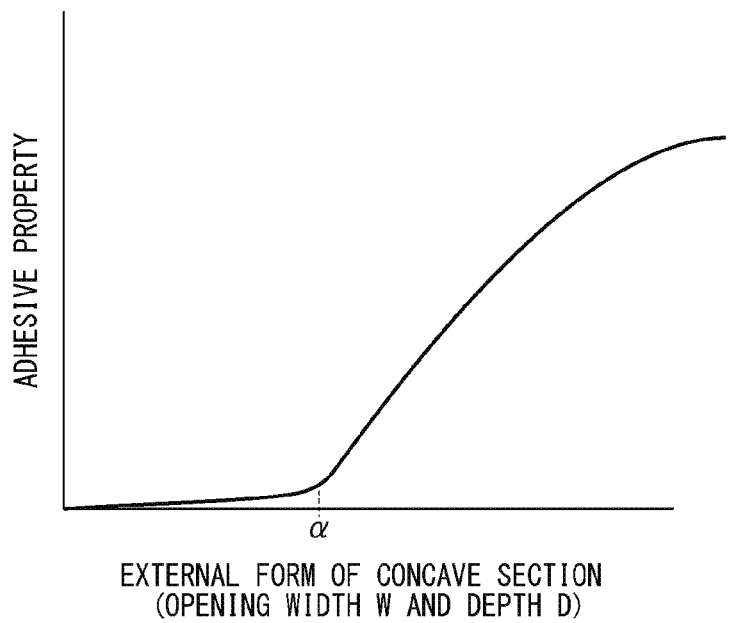
FIG. 5 is a graph showing a relation between an opening width of a concave section and an adhesive property of powder.

FIG. 5 is a graph showing a relation between an external form of the concave section 25 and an adhesive property of the powder 31 when a horizontal axis represents an external form of the concave section 25 and a vertical axis represents an adhesive property between the powder 31 and the insulating film 20. For example, a in FIG. 5 is a particle diameter of the powder 31. As shown in FIG. 5, when the external form of the concave section 25 is smaller than α, since the powder 31 does not enter the concave section 25, an adhesive property between the powder 31 and the insulating film 20 is decreased. When an external form of the concave section 25 is equal to or larger than α, since the powder 31 enters the concave section 25, an adhesive property of the powder 31 is improved by an anchor effect. Accordingly, in order to improve the adhesive property between the powder 31 and the insulating film 20, the external form of the concave section 25 is preferably equal to or more than α, and the larger external form of the concave section 25 is more preferable.

Figure 6:
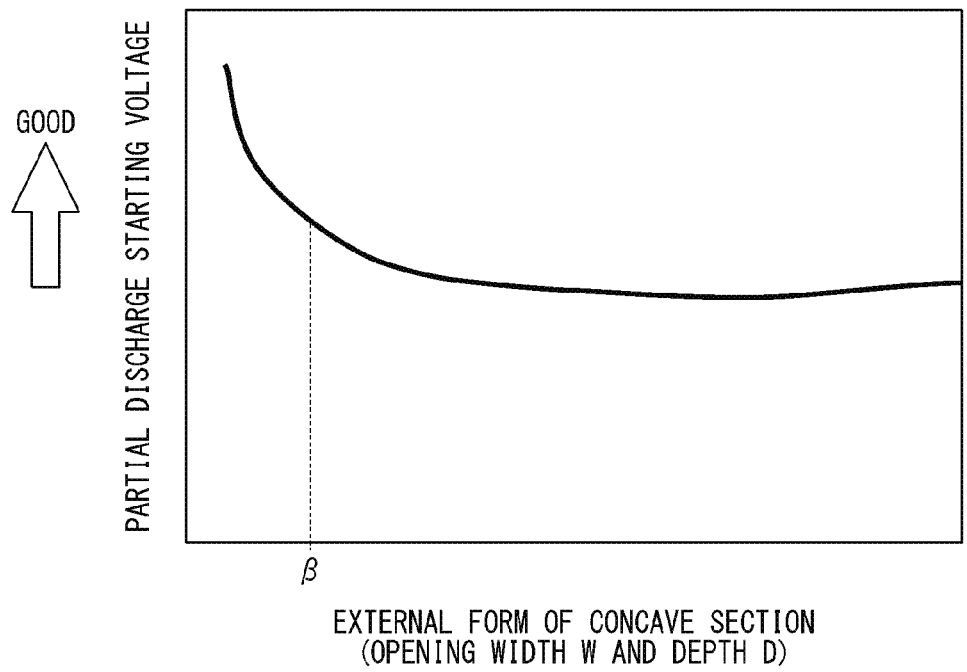
FIG. 6 is a graph showing a relation between a depth of a concave section and a partial discharge starting voltage.

Meanwhile, FIG. 6 is a graph showing a relation between an external form of the concave section 25 and a partial discharge starting voltage when a horizontal axis represents an external form of the concave section 25 and a vertical axis represents a partial discharge starting voltage of the insulating film 20. As shown in FIG. 6, when an external form of the concave section 25 is larger than β, the partial discharge starting voltage is low, i.e., partial discharge easily occurs. When the external form of the concave section 25 is equal to or smaller than β, the partial discharge starting voltage is increased due to a sufficient thickness being secured for the insulating film 20, i.e., partial discharge cannot easily occur. Accordingly, in order to increase the partial discharge starting voltage, the external form of the concave section 25 is preferably β or less, and a smaller external form of the concave section 25 is more preferable.

Accordingly, the external form of the concave section 25 is set to α or more and β or less.

Further, a value of α is a value varying according to a type or the like of the powder 31. In addition, a value of β is a value varying according to a thickness, a type, or the like, of the insulating film 20.

A manufacturing process of the stator 1 has a coil mounting process of mounting the coil 4 on the stator core 3, and a coating process of performing insulating processing on a coil end.

In the coil mounting process, first, in a state in which the coil 4 formed in a U shape overlaps in the radial direction and the circumferential direction, the coil 4 is inserted into the slots 8 of the stator core 3 from one side in the axial direction. Next, the coil 4 is fixed to the stator core 3 by welding portions of the conductor 10 of the coil 4 protruding from the other side in the axial direction to each other.

In the coating process, the coil ends 42 of the coil 4 protruding toward the other side in the axial direction in the coil mounting process is coated with the protective paint 30. More specifically, first, the powder 31 is sprayed to cover the exposed conductor 10 and the insulating film 20 in the vicinity of the conductor 10. After that, coating is completed by fixing the protective paint 30 to the conductor 10 and the insulating film 20 through baking. Further, the coating process also functions as insulating processing of the coil ends 42.

(Actions, Effects)

Next, actions and effects of the stator 1 will be described.

Here, normally, when powder coating is performed on the insulating film 20, the adhesive property between the insulating film 20 and the protective paint 30 may be decreased according to a combination between the insulating film 20 and the protective paint 30.

When peeling and raising of the protective paint occur according thereto, insulating performance may be decreased due to foreign substances being incorporated or the conductor being exposed 10. For this reason, there is a necessity of combination in consideration of the adhesive property, and selection of a type of the protective paint 30 or a material of the insulating film 20 is limited.

According to the stator 1 of the configuration, since the concave section 25 is formed in the surface of the insulating film 20, a contact area between the insulating film 20 and the protective paint 30 is increased by the concave section 25, and an adhesive property of the protective paint 30 with respect to the insulating film 20 can be improved. In addition, the adhesive property of the protective paint 30 with respect to the insulating film 20 can be improved by an anchor effect in which the protective paint 30 enters the concave section 25. Accordingly, peeling and raising of the protective paint 30 can be minimized, and a decrease in insulating performance due to foreign substances being incorporated or the conductor being exposed 10 can be minimized.

In addition, since the adhesive property between the insulating film 20 and the protective paint 30 can be improved regardless of a combination of materials of the insulating film 20 and the protective paint 30, a degree of freedom in material selection of the insulating film 20 and the protective paint 30 can be improved.

Accordingly, it is possible to provide the stator 1 in which the adhesive property between the insulating film 20 and the protective paint 30 of the coil 4 is improved and insulating performance in the coil ends 42 is secured.

In addition, since the protective paint 30 has the powder 31 and the internal form of the concave section 25 in the insulating film 20 is larger than the external form of the powder 31, the powder 31 can reliably enter the concave section 25. Accordingly, in comparison with the case in which the internal form of the concave section 25 is smaller than the external form of the powder 31, a contact area between the insulating film 20 and the powder 31 can be increased. Accordingly, peeling and raising of the powder 31 with respect to the insulating film 20 can be minimized, and a decrease in insulating performance due to foreign substances being incorporated or the conductor being exposed 10 can be minimized.

In addition, since the insulating film 20 is formed of polyimide to have the hollow capsules 23, the convex section 24 is formed in the surface of the insulating film 20 by the plurality of protruding capsules 23. Here, the concave sections 25 are formed between the convex sections 24 of the capsules 23. Accordingly, when the protective paint 30 enters the concave section 25, the adhesive property of the protective paint 30 with respect to the insulating film 20 can be improved.

In addition, there is no need to provide another process of forming the concave section 25 in the insulating film 20, and a manufacturing process can be simplified.

Accordingly, it is possible to provide the stator 1 in which the adhesive property between the insulating film 20 and the protective paint 30 is improved according to a simple configuration.

Figure 7:
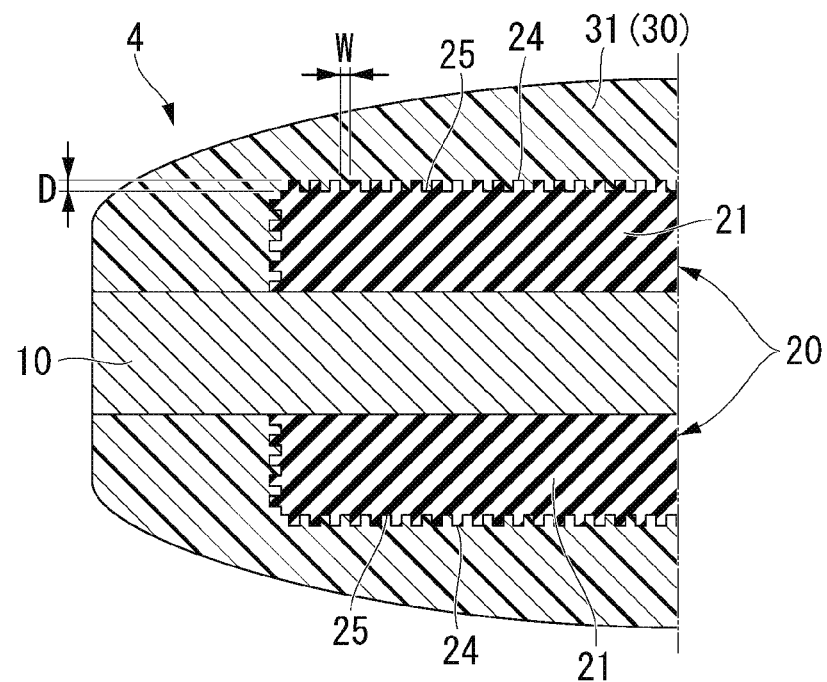
FIG. 7 is a cross-sectional view of a coil in the vicinity of a welding section according to a second embodiment.
Figure 8:
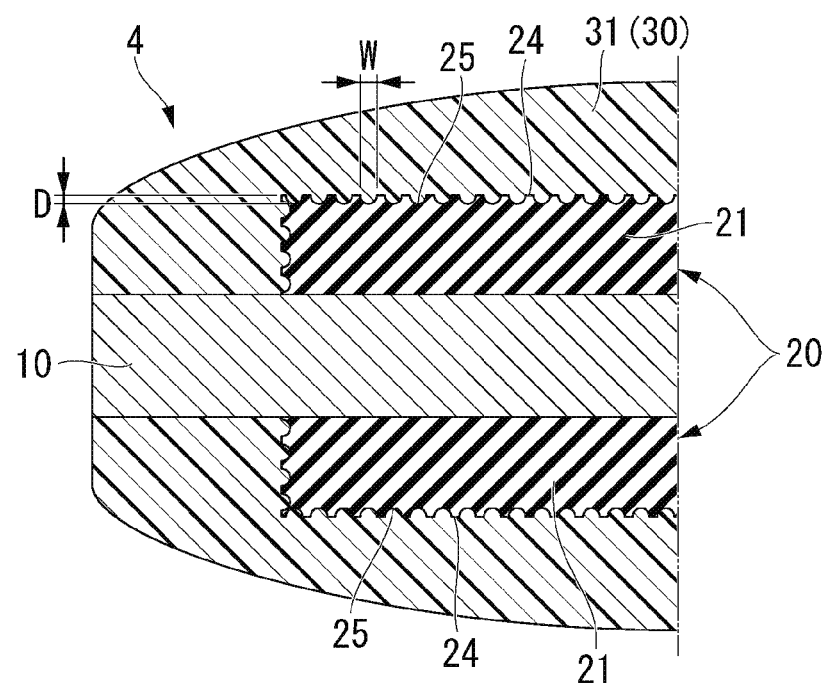
FIG. 8 is a cross-sectional view of a coil in the vicinity of a welding section according to a third embodiment.

Next, a second embodiment and a third embodiment according to the present invention will be described. FIG. 7 is a cross-sectional view of a coil 4 in the vicinity of a welding section 11 according to the second embodiment of the present invention. FIG. 8 is a cross-sectional view of a coil 4 in the vicinity of a welding section 11 according to the third embodiment of the present invention.

In the following description, components the same as in the above-mentioned first embodiment are designated by the same reference numerals and appropriate description thereof will be omitted. In addition, reference numerals related to components other than those disclosed in FIG. 7 and FIG. 8 will appropriately refer to FIG. 1 to FIG. 6.

Second Embodiment

A second embodiment according to the present invention will be described. The embodiment is distinguished from the above-mentioned embodiment in that the concave sections 25 are formed regardless of the capsules 23.

As shown in FIG. 7, the concave sections 25 having a rectangular cross section are formed in the surface of the insulating film 20. The concave sections 25 are provided between the convex sections 24 by forming the convex sections 24 during, for example, formation of the insulating film 20. Further, a part of the flat insulating film 20 may be cut out to form the concave sections 25.

According to the configuration, in addition to the same actions and effects as in the above-mentioned embodiment, since the opening width W and the depth D of the concave section 25 can be arbitrarily adjusted, the concave section 25 according to a size or the like of the powder 31 can be formed. Accordingly, the adhesiveness to the protective paint 30 can be further improved. In addition, the protective paint 30 may also be applied to the insulating film 20 having no hollow capsules 23.

Third Embodiment

A third embodiment according to the present invention will be described. The embodiment is distinguished from the above-mentioned embodiment in that the internal form of the concave section 25 is formed in a curved surface shape.

As shown in FIG. 8, the concave section 25 having a circular cross section is formed in the surface of the insulating film 20. A method of forming the concave sections 25 may be forming the convex sections 24 at locations other than those of the concave sections 25 like in the second embodiment with the concave sections 25 being defined therebetween or directly forming the concave sections 25 in the insulating film 20 through cutting out or punching.

According to the configuration, in addition to the same actions and effects of the above-mentioned embodiment, since the spherical the powder 31 enters along the concave curved shape of the concave section 25, an occupancy rate of the powder 31 with respect to the concave section 25 can be increased and a contact area between the powder 31 and the insulating film 20 can be increased. Accordingly, an adhesive property to the protective paint 30 can be further improved.

Further, the technical scope of the present invention is not limited to the above-mentioned embodiments, and various modifications may be made without departing from the scope of the present invention.

For example, the cross-sectional shape of the concave section 25 is not limited to a rectangular shape and a circular shape. The cross-sectional shape may be shapes other than a rectangular shape and a circular shape, for example, a triangular shape, an elliptical shape, or the like.

In addition, a material of the film main body 21 may be an insulating resin other than polyimide.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A stator comprising:
   a stator core; and
   a coil mounted on the stator core and having an insulating film, at least a part of the insulating film being coated with a protective paint,
   wherein the insulating film includes hollow capsules,
   a concave section is formed in a surface of the insulating film,
   the concave section is provided between convex sections formed by the hollow capsules which are exposed from the surface of the insulating film, and
   the protective paint is present in the concave section.

2. The stator according to claim 1, wherein the protective paint has a powder, and
   an internal form of the concave section is larger than an external form of the powder.

3. The stator according to claim 1, wherein the insulating film is formed of a polyimide.

4. The stator according to claim 1, wherein a convex section is formed on the surface of the insulating film, the concave section positioned adjacent to the convex section, and the protective paint further present in the convex section.

5. The stator according to claim 4, wherein the concave section is positioned between the convex section and a second convex section formed on the surface of the insulating film.

6. The stator according to claim 4, wherein the convex section is at least a portion of the hollow capsules located at the surface of the insulating film.

7. The stator according to claim 6, wherein the hollow capsules comprises a resin material that is different than a material of the insulating film.

8. The stator according to claim 7, wherein the hollow capsule is a silicone capsule.

9. The stator according to claim 4, wherein the concave section is formed into the surface of the insulating film.

10. The stator according to claim 1, wherein the protective paint is further present on the surface of the insulating film other than the concave section.

11. The stator according to claim 1, wherein the protective paint is formed from a powder resin.

12. The stator according to claim 11, wherein an external form of the concave section is greater than or equal a particle diameter of the powder resin and less than or equal to a partial discharge starting voltage threshold.

* * * * *